(12) United States Patent
Markley

(10) Patent No.: US 8,979,684 B2
(45) Date of Patent: Mar. 17, 2015

(54) MECHANICAL TENSIONER WITH ONE WAY DAMPING

(75) Inventor: George L. Markley, Montour Falls, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 297 days.

(21) Appl. No.: 13/696,824

(22) PCT Filed: May 18, 2011

(86) PCT No.: PCT/US2011/136931
§ 371 (c)(1),
(2), (4) Date: Nov. 8, 2012

(87) PCT Pub. No.: WO2011/146570
PCT Pub. Date: Nov. 24, 2011

(65) Prior Publication Data
US 2013/0059687 A1    Mar. 7, 2013

Related U.S. Application Data

(60) Provisional application No. 61/347,003, filed on May 21, 2010.

(51) Int. Cl.
*F16H 7/08* (2006.01)

(52) U.S. Cl.
CPC ...... *F16H 7/0831* (2013.01); *F16H 2007/0806* (2013.01); *F16H 2007/084* (2013.01); *F16H 2007/0851* (2013.01); *F16H 2007/0874* (2013.01); *F16H 2007/0893* (2013.01)
USPC .......................................... 474/111

(58) Field of Classification Search
CPC .......... F16H 7/0831; F16H 2007/0806; F16H 2007/084; F16H 2007/851; F16H 2007/874; F16H 2007/0893
USPC .................. 474/100, 101, 109, 110, 111, 140
See application file for complete search history.

(56) References Cited

U.S. PATENT DOCUMENTS

| 2,129,107 | A | 9/1938 | Taylor |
| 2,210,276 | A | 8/1940 | Bremer |
| 3,856,101 | A | 12/1974 | Allison |

(Continued)

FOREIGN PATENT DOCUMENTS

| FR | 2832358 B1 | 2/2004 |
| JP | 1976058270 | 10/1949 |

(Continued)

*Primary Examiner* — William E Dondero
*Assistant Examiner* — Robert T Reese
(74) *Attorney, Agent, or Firm* — Helmholdt Law PLC; Thomas D. Helmholdt

(57) ABSTRACT

An apparatus for imparting tension to multiple strands of an endless loop power transferring member encircling a drive sprocket and at least one driven sprocket. A tensioner mechanism includes a slider assembly having a fixed body defining a slot, a slider body engaged within the slot for movement between opposite ends of the slot, and a spring urges the slider body toward one end of the slot. The slider body is operably engageable with at least one tensioning arm for driving the at least one tensioning arm to tension the power transferring member. A link assembly can include two link members pivotally connected to the slider body at first ends and individually connected at second ends to two tensioning arms.

14 Claims, 4 Drawing Sheets

(56) References Cited

U.S. PATENT DOCUMENTS

| | | |
|---|---|---|
| 3,869,138 A | 3/1975 | Allison |
| 5,489,056 A | 2/1996 | Staschewski |
| 5,951,423 A | 9/1999 | Simpson |
| 5,967,922 A | 10/1999 | Ullein et al. |
| 6,312,351 B1 * | 11/2001 | Simpson et al. ............... 474/110 |
| 6,322,470 B1 | 11/2001 | Markley et al. |
| 6,358,169 B1 | 3/2002 | Markley |
| 6,849,015 B2 | 2/2005 | Markley et al. |
| 6,955,621 B2 | 10/2005 | Wigsten et al. |
| 6,960,145 B2 | 11/2005 | Fraley, Jr. et al. |
| 7,097,579 B2 | 8/2006 | Markley |
| 7,429,226 B2 | 9/2008 | Tryphonos |
| 7,476,168 B2 | 1/2009 | Markley et al. |
| 8,529,388 B2 * | 9/2013 | He ............... 474/111 |
| 2002/0025869 A1 * | 2/2002 | Serkh et al. ............... 474/135 |
| 2004/0043854 A1 | 3/2004 | Fraley, Jr. et al. |
| 2006/0270502 A1 | 11/2006 | Markley et al. |
| 2008/0070731 A1 | 3/2008 | Vrsek et al. |
| 2009/0062046 A1 * | 3/2009 | Lindemann ............... 474/101 |
| 2009/0143177 A1 | 6/2009 | Nakano et al. |
| 2009/0264232 A1 | 10/2009 | Bauer et al. |
| 2009/0325749 A1 | 12/2009 | Wigsten |
| 2009/0325750 A1 | 12/2009 | Wigsten et al. |
| 2011/0105257 A1 * | 5/2011 | He ............... 474/111 |

FOREIGN PATENT DOCUMENTS

| | | |
|---|---|---|
| JP | 1978064161 | 6/1978 |
| JP | 1999223250 | 8/1999 |
| JP | 2002089636 A | 3/2002 |
| JP | 2006329418 | 12/2006 |
| WO | 2008028023 A2 | 6/2008 |

* cited by examiner

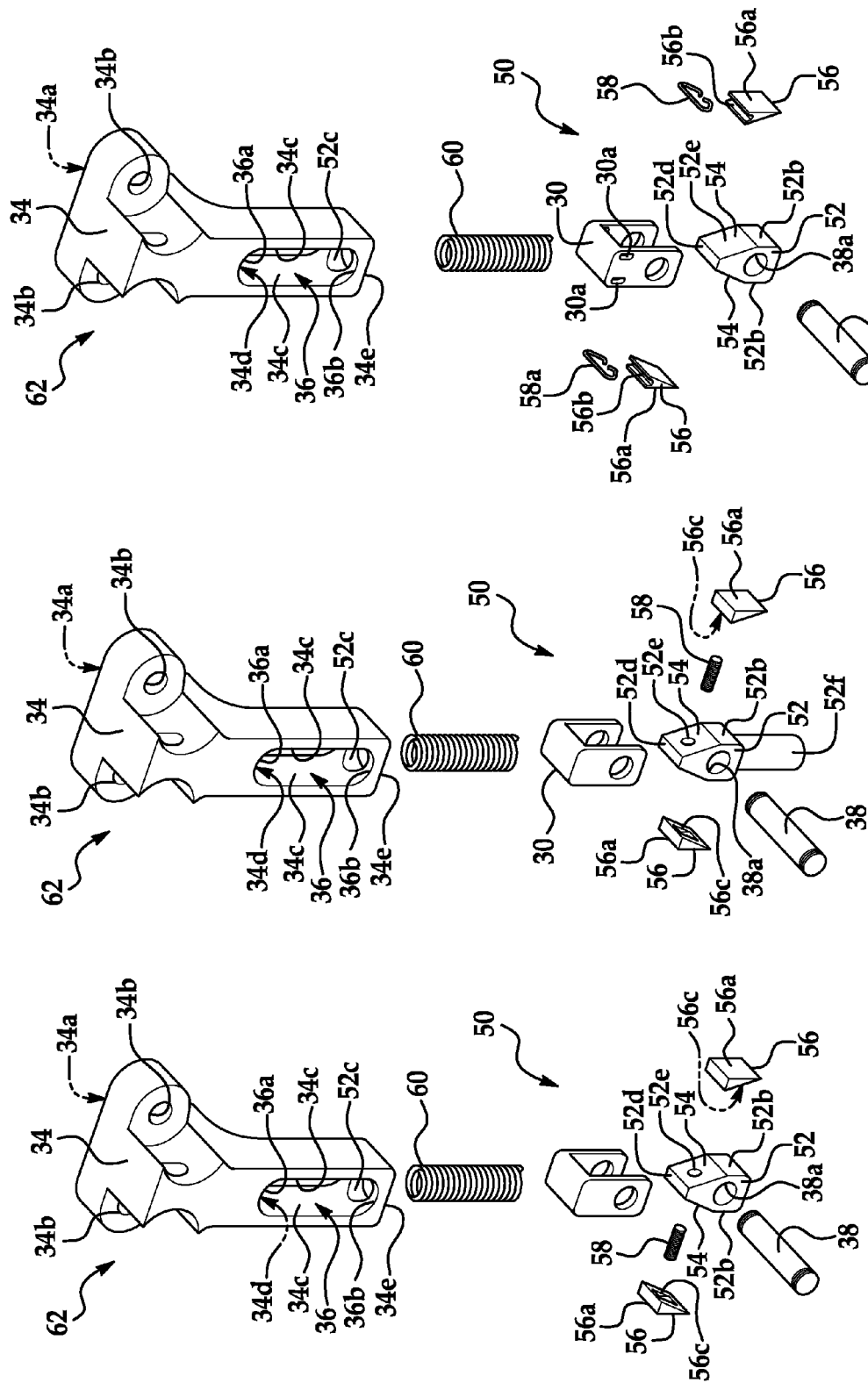

MECHANICAL TENSIONER WITH ONE WAY DAMPING

FIELD OF THE INVENTION

The invention relates to a tensioning system for imparting tension to a power transferring member or chain encircling a driving sprocket and at least one driven sprocket, and more particularly, to a tensioner that simultaneously tensions multiple strands of the power transferring member or chain.

BACKGROUND

Chain tensioners in engines are used to control the power transmission chains as the chain travels around a plurality of sprockets. The slack of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner for example, in an engine with a chain driven camshaft, the engine may be damaged because the camshaft timing is misaligned by several degrees due to slippage or tooth jumping.

Various configurations for closed loop chain tensioner systems are known from U.S. Pat. No. 7,476,168: U.S. Pat. No. 7,429,226; U.S. Pat. No 6,955,621; U.S. Pat. No. 6,322,470; U.S. Pat. No. 5,951,423; U.S. Pat. No. 5,489,056; U.S. Pat. No. 3,856,101; U.S. Pat. No. 2,210,276; French Patent No. 2,832,358; and Japanese Patent No. 2002-089,636. While each of these configurations is satisfactory for performing its intended function, several of these configurations provide restricted space and location sites for the tensioner driver. It would be desirable to provide a tensioning system that overcomes these limitations, and that provides additional benefits as described below.

SUMMARY

A tensioning system imparts tension to an endless loop of chain encircling a drive sprocket and at least one driven sprocket. A mechanical tensioner can include a fixed slotted body, a slider assembly having a slider body with two interior opposing angular surfaces, at least one wedge spring and a biasing spring to bias the slider assembly in one direction. When the slider assembly is being biased, the wedges, within the corresponding wedge pockets, go along for the ride. When the slider assembly is forced to move opposite the biased direction, the wedge spring forces the wedges into contact with the slot sides of the slotted body. The friction from this contact, plus the wedging effect from further movement, increases this friction. The wedge angle determines the resistance to sliding (i.e. friction) between the wedges of the slider assembly and the sides of the slot, to the point of binding. A pin inserted through the slider body allows for pivotally attaching link pieces, on both sides, for the purpose of containing the slider within the slot of the slotted body and of pulling or pushing one or more tensioning arms, each with a friction face for contact with the timing chain, into a timing chain strand or belt strand for removing the slack and applying a tensioning load.

Other applications will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2A is an exploded perspective or isometric view of the mechanical tensioner with one way damping of FIG. 1 with the endless loop of belt or chain, the drive sprocket, the at least one driven sprocket, and the link assembly removed for clarity;

FIG. 3A is an exploded perspective or isometric view of another mechanical tensioner with one way damping with the endless loop of belt or chain, the drive sprocket, the at least one driven sprocket, and the link assembly removed for clarity;

FIG. 4A is an exploded perspective or isometric view of another mechanical tensioner with one way damping with the endless loop of belt or chain, the drive sprocket, the at least one driven sprocket, and the link assembly removed for clarity;

DETAILED DESCRIPTION

The term "belt" or "chain", as used interchangeably herein, is any power transferring member forming an endless loop and constructed of flexible material or of articulated rigid links to permit the member to conform to a radius of curvature of a pulley or sprocket drive face and intended, in use, to be driven in an endless path; and, by contact with the pulley or sprocket drive face, to transmit power to or extract power from the pulley or sprocket. The term a "pulley" or "sprocket", as used interchangeably herein, is a device rotatable about an axis and having a drive face radially spaced from the axis of rotation for intended power transferring engagement with a belt or chain to drive the belt or chain on an endless path or to extract power from the belt or chain to drive an output load device. The term "guide roll" as used herein is a device rotatable about an axis and having a belt or chain-contacting face radially spaced from the axis of rotation for intended enuagement with the belt or chain to aid in directing the belt or chain along an intended path of travel. A guide roll, as distinguished from a pulley or sprocket, is not intended to provide driving power to, or extract power from, a belt or chain. The term "tensioning arm" as used herein is a member other than a pulley or sprocket engageable with a belt or chain, and which is adjustable or relatively movable with respect to the belt or chain in a direction which causes an increase or decrease in tensile stress in the belt or chain or a take-up of any undesirable belt or chain slack to maintain a desirable drive traction between the belt or chain and the pulley or sprocket drive face. A tensioning arm, as distinguished from a guide roll, has a non-rotatable face portion for contacting the belt or chain, whereby the belt or chain slides over the face portion of the tensioning arm.

Figure 1:
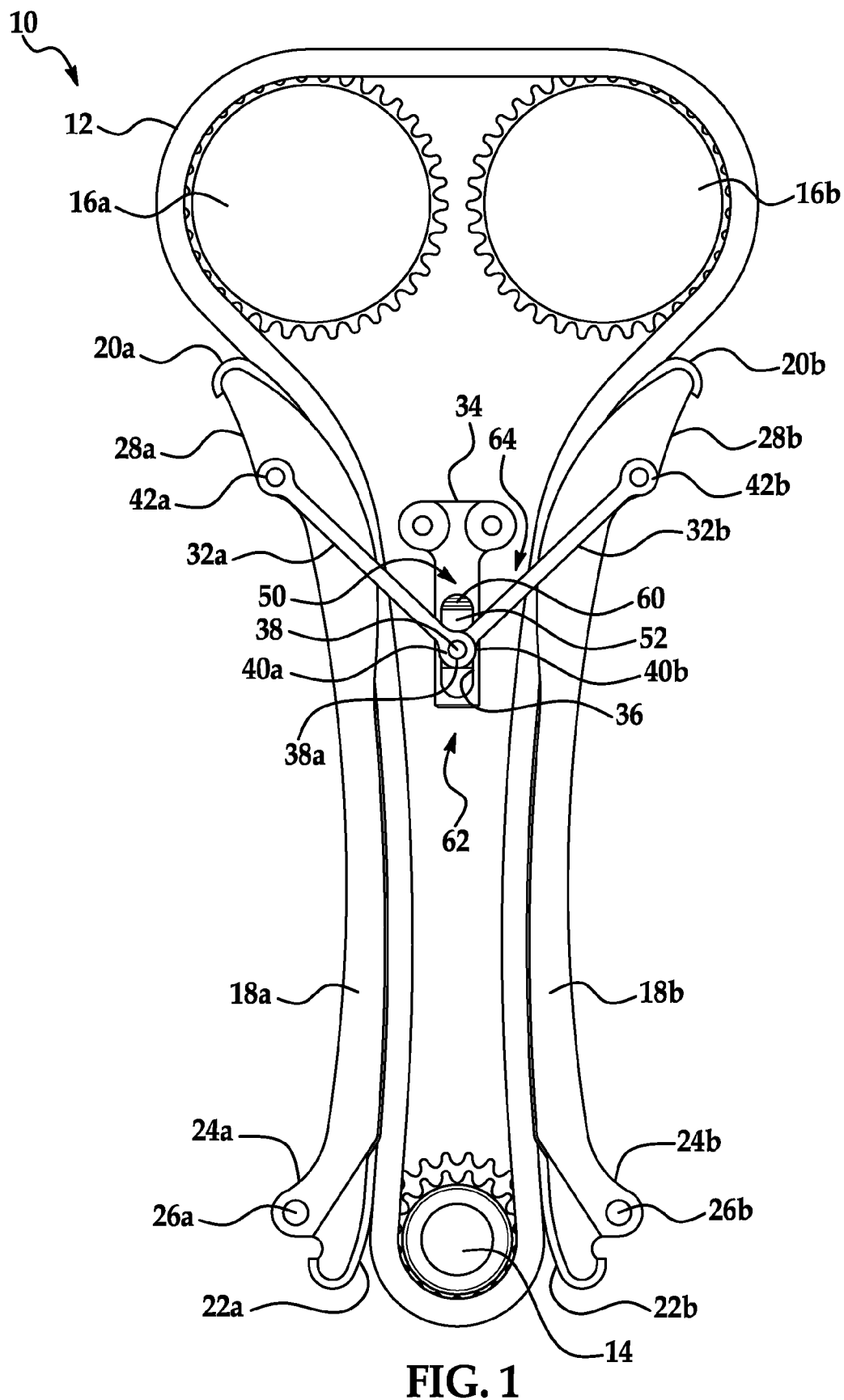
FIG. 1 is a front view of a timing system including a multi-strand tensioning arrangement having an endless loop of belt or chain, a drive sprocket, at least one driven sprocket, and a mechanical tensioner with one way damping.

FIG. 1 illustrates a multi-strand tensioning arrangement or apparatus 10 including an endless loop power transferring member 12, by way of example and not limitation, such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe 20a, 20b with a chain sliding surface 22a, 22b extending along a significant length of the arm. A blade type spring can be applied within the tensioning arm 18a, 18b between the arm body and the shoe 20a, 20b to provide supplemental tensioning as needed. Each shoe 20a, 20b can be spring loaded with a blade type spring positioned within a pocket of the complaint face assembly, if desired. The spring can be located between the tensioning arm 18a, 18b and the corresponding shoe 20a, 20b deforming the shoe away from the tensioning arm. A spring loaded shoe 20a, 20b in the tensioning arm 18a, 18b can provide for localized strand tensioning, supplementing the limited tensioning arm 18a, 18b motion due to the two tensioning arms 18a, 18b being linked together, or for an intentionally softened tensioner spring. Spring loading of the tensioning shoe is optional, if desired. It should also be recognized that the blade type spring between the body of the tensioning arms 18a, 18b and the corresponding shoes 20a, 20b could be eliminated, eliminating the compliant face assembly.

Inside the chain strands, and preferably along a chain centerline (i.e. a line spaced equidistant between the two strands of the chain), is a rigidly fixed slotted body 34 defining a slot 36 with outer ends extending generally between the drive sprocket 14 and at least one driven sprocket 16a, 16b. The fixed body 34 is located generally central to and inside of the endless loop of chain 12 as best seen in FIG. 1. A slider assembly 50 is retained in the slot 36. The slider assembly 50 can include a slider body 52 with two angular surfaces 54, at least two wedges 56, at least one wedge spring 58, and a biasing spring 60 to bias the slider assembly 50 in one direction. The slider body 52 can be pivotally constrained to the first end 40a of the first link member 32a and the first end 40b of the second link member 32b, restricting the movement of both first ends 40a, 40b of the first and second link members 32a, 32b to that defined by the slot 36. The slot body 34 limits the sidewise motion of the first ends 40a, 40b and the clocking of the driven sprockets 16a, 16b. The link end 28a of the first tensioning arm 18a is pivotally attached to the second end 42a of the first link member 32a. The link end 28b of the second tensioning arm 18b is pivotally attached to the second end 42b of the second link member 32b.

Additional driven sprockets to those illustrated in FIG. 1 can also be added, if desired. The tensioning arms 18a, 18b, link members 32a, 32b, slot defining fixed body 34, and slider assembly 50 can be inverted so the pivoting ends 24a, 24b of the tensioning arms 18a, 18b are located near the cam or driven sprockets 16a, 16b. The multi-strand tensioning arrangement 10 can be used for any drive with a drive pulley or sprocket 14 and at least one driven pulley or sprocket 16a, 16b.

Figure 5:
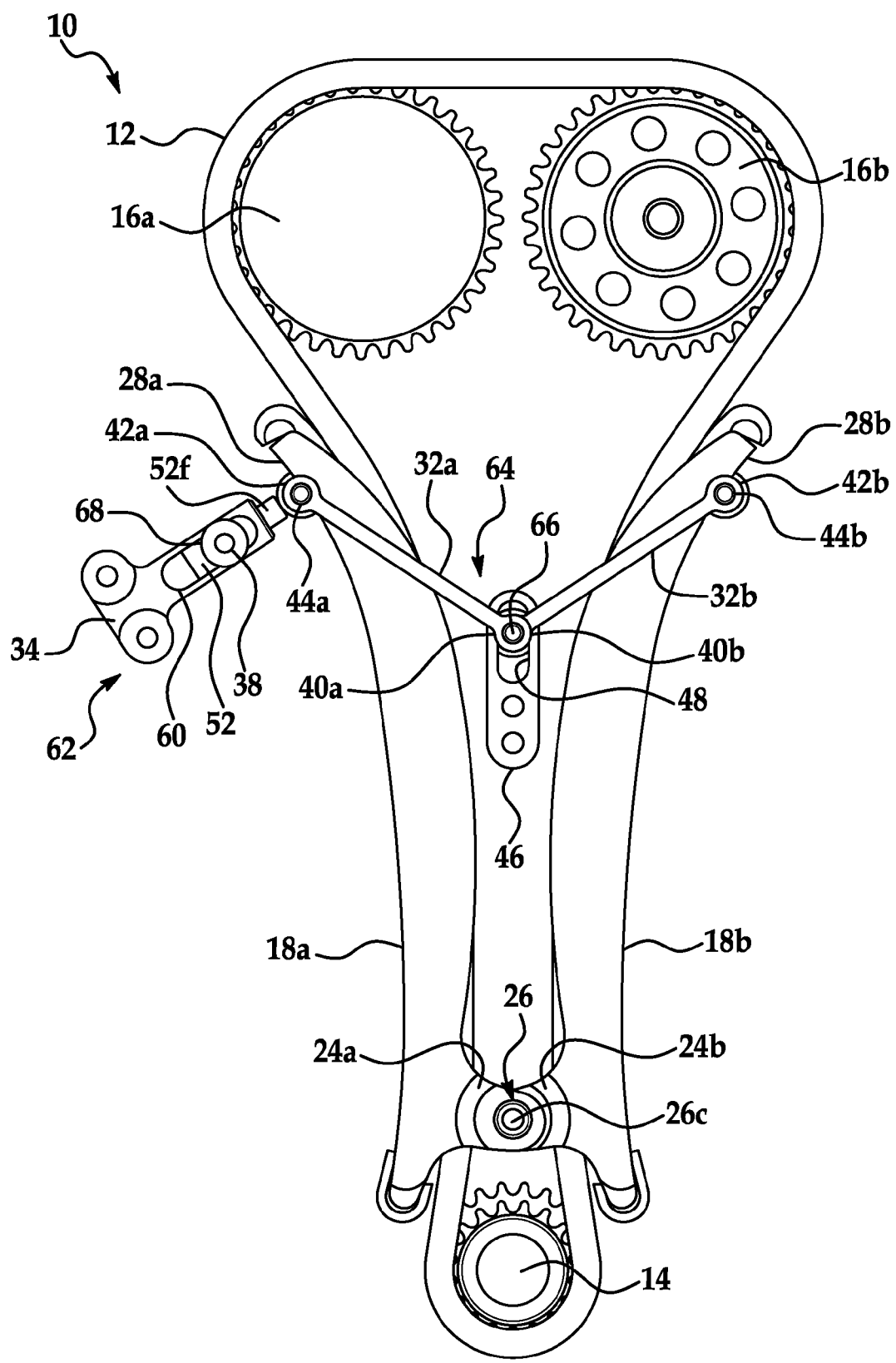
FIG. 5 is a front view of a timing system including a multi-strand tensioning arrangement having an endless loop of belt or chain, a drive sprocket, at least one driven sprocket, and a mechanical tensioner with one way damping.

It should be recognized that one common arm pivot pin 26c as shown in FIG. 5 can be located near the drive sprocket inside the chain loop, if desired, or alternatively two individual arm pivot pins 26a, 26b can be located near the drive sprocket outside the chain loop, as illustrated in FIG. 1. It should also be recognized that two individual arm pivot pins can be located near the driven sprocket or sprockets outside the chain loop, if desired. The endless loop power transferring member 12, such as a continuous belt or chain, can encircle the drive pulley or sprocket 14 and at least one driven pulley or sprocket 16a, 16b. The drive pulley or sprocket 14 can fix one part of a path of the continuous endless loop of chain 12, while at least one driven sprocket 16a, 16b fixes another part of the path of the continuous endless loop power transferring member 12.

Figure 2B:
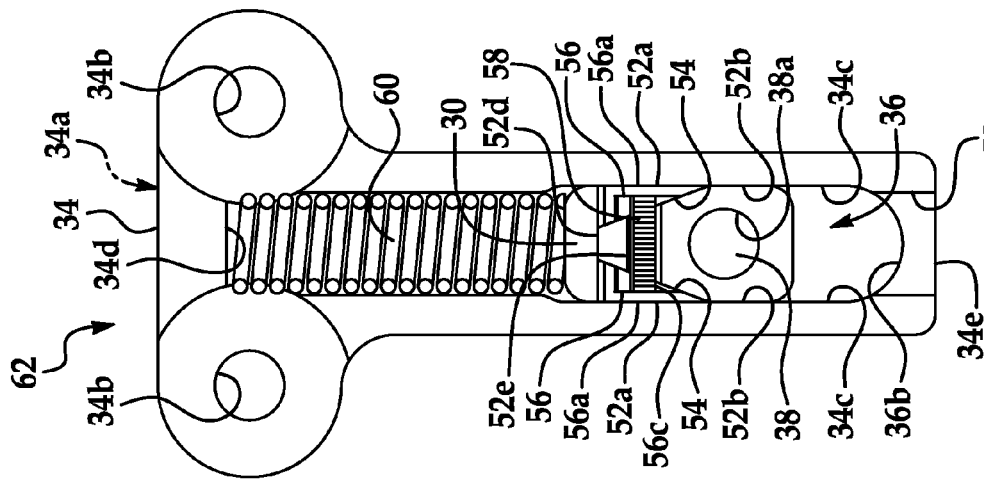
FIG. 2B is an assembled view of the mechanical tensioner with one way damping of FIG. 2A.

Referring now to FIGS. 2A 2B, the mechanical tensioner with one way damping mechanism 62 is the source of force that causes the primary tensioning of the chain 12, and can include the slider assembly 50 and link assembly 64 including link members 32a 32b. When the slider assembly 50 of the mechanical tensioner mechanism 62 is biased by the biasing spring 60 in one direction with respect to the fixed body 34, the slider body 52 applies force to the first and second link members 32a, 32b and corresponding pivoting moment at the link end of the first and second arms 18a, 18b, forcing the first and second ends 40a, 40b of the first and second link members 32a, 32b to move within the slot 36 of the fixed body 34 while simultaneously moving the first and second tensioning arms 18a, 18b toward the chain centerline in a tensioning manner. Being that the first and second ends 40a, 40b of the link members 32a, 32b are pivotally attached to the slider body 52, the link members 32a, 32b also move relative to the slot 36 of the fixed body 34 and correspondingly move the first and second tensioning arms 18a, 18b toward the chain centerline thereby tensioning the chain 12 nearly simultaneously and nearly equally on both strands.

A mechanical tensioner mechanism 62 can include a slotted body 34 for the purpose of fixing and containing the other components that make up the mechanical tensioner assembly 62. The slotted body 34 can have a mounting surface 34a with anchoring apertures 34b for receiving fasteners therethrough, by way of example and not limitation, such as a threaded bolt. A distant perpendicular elongated slot 36 defined by slot sides 34c and a blind aperture 34d from outside a far end 34e of the slot 36 can end in the proximity of the anchoring apertures 34b. A slider body 52 can include or define two pockets 52a, on opposite sides 52b, with interior angular surfaces 54, and having a triangular cross section, the short sides of which are near one end 52d of the slider body 52. The slider body pockets 52a house two matching triangular wedges 56 positioned such that a side 56a of each wedge 56 is parallel to the sides 52b of the slider body 52 and the sides 34c of the slot 36 in the slotted body 34 when the slider body 52 is placed within the slot 36. A cross drilled aperture 52e between the pockets 52a houses a lightly loaded compression spring 58 for the purpose of maintaining a friction force between the wedges 56 and the slot sides 34c. A pin 38 projects from both sides of the slider body 52 that are perpendicular to the sides 52b with pockets 52a, for attaching containment features such as link members 32a, 32b for pulling or pushing with, or washers 68 (as shown in FIG. 5) with diameters larger than the slot width. The blind aperture 34d can house a compression spring 60 for biasing the slider body 52 and wedges 56 away from the bolted end of the slotted body 34. When the slider body 52 is urged by the biasing spring 60 away from the bolted end of the slotted body 34, the wedges 56 are pushed along for the ride while maintaining light contact with the slot sides 34c. If the slider body 52 reverses direction to move against the biasing spring 60, the friction, between the wedges 56 and the slot side walls 34c, drags the wedges 56 against their opposing inclined faces and forces the wedges 56 outward, in proportion to the angle of the inclined face and wedge 56, further increasing the friction load and inhibiting movement against the biasing spring 60.

The slotted body 34 can include a mounting surface 34a, a large through oval slot 36 defined by slot side walls 34c, a blind aperture 34d for a compression spring 60 located at one end 36a of the slot 36 and mounting apertures 34b parallel to the slot 36 through the body 34 to a mounting pad or surface 34a offset from the bottom of the slot 36. The slotted body 34 can contain the mounting apertures 34b for fixing the assembly, the slot sides 34c for constraining the slider body 52 to a linear motion, and an aperture 34d for housing the compression spring 60 that biases the slider body 52 from one slot end 36a toward the other end 36b, while providing the desired tensioning force.

The slider body 52, generally an extruded rectangle shape, can fit loosely between the sides 34c of the slot 36 in the slotted body 34, with a pocket 52a on each side 52b having a narrow wall top and bottom. Each pocket 52a has a right triangle shaped top and bottom surfaces with the side adjacent common to the side 52b of the slider body 52 and the side opposite forms a surface perpendicular to the side 52b of the slider body 52 and near the end 36a next to the blind aperture 34d of the slotted body 34. A through aperture 52c can exist between the perpendicular ends of the slider body 52 from top to bottom and on the centerline near the end 36b away from the blind aperture 34d of the slotted body 34. The slider body 52 can contain an aperture 38a for a pin 38 to which tensioning link members 32a, 32b are attached, a cross drilled aperture 52e for the wedge spring 58 and the pockets 52a to constrain the wedges 56 and force the wedges 56 into contact with the sides 34c of the slot 36 of the slotted body 34 by the force of the wedge spring 58.

A compression spring 60 for biasing the slider body 52 can be positioned within the slotted body 34. The compression spring 60 can be housed at the end 36a of the slot 36 in the slotted body 34 nearest the mounting apertures 34b, and can apply the tensioning force to the slider body 52, imparted through the pin 38 and the link members 32a, 32b to the tensioning arms 18a, 18b and the strands of the endless loop power transferring member 12.

Two wedges 56 with a right triangle shaped top and bottom to fit within the slider body pockets 52a, can have an elongated flat bottom bore 56c perpendicular to the side adjacent centrally located in the side representing the hypotenuse. The wedges 56 can be biased by the force of the wedge spring 58 in a direction that forces the wedges 56 to maintain a light contact force to the slot sides 34c of the slotted body 34. When the slider body 52 moves against the compression spring 60 the wedge angle multiplies the contact force to the slot sides 34c.

A compression spring 58 can be located within an aperture 52e in the slider body 52 located perpendicular to the slot sides 34c, with the ends in the flat bottom bores 56c of the wedges 56 for the purpose of maintaining friction between the wedges 56 and the slot sides 34c. The wedge spring 58 can force the wedges 56 into contact with the sides 34c of the slot 36 of the slotted body 34.

A pin 38 can protrude from the top and bottom of the slider body 52, for attaching link members 32a, 32b. The pin 38 to which link members 32a, 32b are connected, with at least one link member 32a, 32b located on one side of the slotted body 34 and at least one link member 32a, 32b located on an opposite side of the slotted body 34, so that the link members 32a, 32b can contain the slider body 52 within the slot 36 of the slotted body 34.

At least two link members 32a, 32b can be connected to the pin 38, with one link member 32a, 32b on each side of the slider body 52 and located outside of the slotted body 34. The link members 32a, 32b can be attached to the slider pin on the top and bottom of the slider body 52 to keep the slider body 52 within the slot 36 of the slotted body 34 and the other end of which can connect to whatever needs to be pulled or pushed for the tensioning function.

The slotted body 34 can provide the anchor for the tensioner mechanism 62, the slot 36 can determine the direction of the tensioning motion and the sides 34c can provide for binding with the wedges 56 in the event a force should present itself to reverse the tensioning motion. The slider body 52 can be guided in the tensioning direction that carries the pin 38 for connecting to, for containment of the slider body 52 within the slotted body 34, and for transferring the tensioning force of the compression spring 60. The slider body 52 can also provide for the containment of the wedges 56 and the wedge spring 58 that create the resistance to backward motion. The compression spring 60 provides the tensioning force the system requires. The wedges 56 are forced to maintain a friction contact force with the sides 34c of the slot 36 of the slotted body 34 by the wedge spring 58. The friction contact force is multiplied in relation to the wedge ramp angle should the motion reverse direction.

Figure 3B:
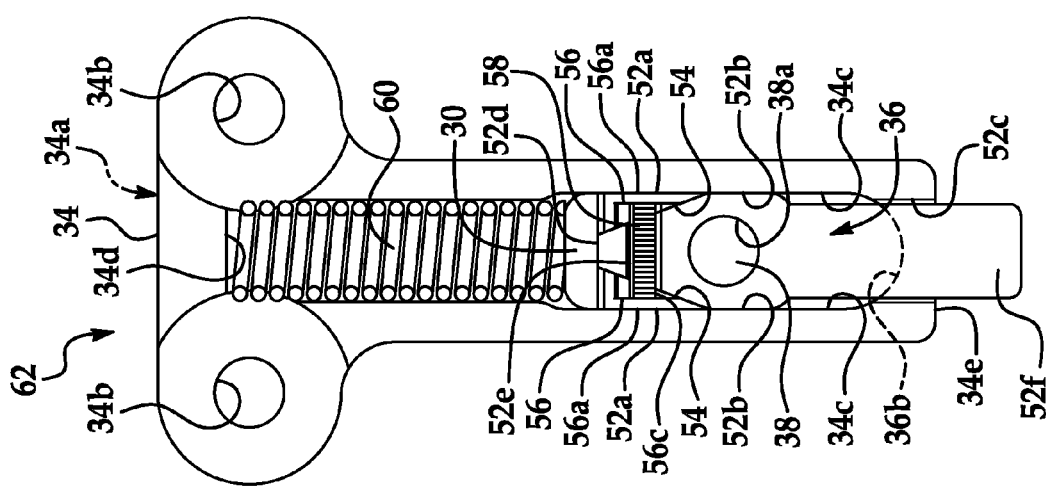
FIG. 3B is an assembled view of the mechanical tensioner with one way damping of FIG. 3A.

Referring now to FIGS. 3A-3B, the configuration of the mechanical tensioner assembly 62 is identical to that illustrated and described with respect to FIGS. 2A-2B, with the exception of a cylindrical portion 52f can be added to the end of the slider body 52 located away from the biasing spring 60 and can be used to push with, similar to a piston in a hydraulic tensioner located outside the endless loop power transferring member 12, instead of pulling or pushing the link members 32a, 32b from inside the endless loop power transferring member 12 as illustrated in FIG. 1. When used as a standalone mechanical tensioner assembly 62, washers 68 (shown in FIG. 5) can be assembled to outer ends of pin 38 on opposite sides of the slotted body 34 to maintain the slider body 52 within the slot 36 of the slotted body 34, while allowing movement of the slider body 52 in response to urgings of biasing spring 60 between the longitudinal ends 36a, 36b of the slot 36.

Referring briefly now to FIG. 5, the mechanical tensioner assembly 62 of FIGS. 3A-3B can be used as a standalone tensioner, by way of example and not limitation, such as a replacement for a hydraulic tensioner, operably engageable with at least one tensioning arm 18a, 18b outside of the endless loop power transferring member 12. The multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe with a power-transferring-member-sliding surface 22a, 22b extending along a significant length of the arm. Each shoe can be spring loaded with a blade type spring positioned within a pocket of the complaint face assembly, if desired. The spring can be located between the tensioning arm 18a, 18b and the corresponding shoe deforming the shoe away from the tensioning arm. Each of the tensioning arms 18a, 18b has an arm movement guide mechanism 26, by way of example and not limitation, such as a pivoting end 24a, 24b for rotation about a fixed pin, which can be a common fixed pivot pin 26c. Each of the tensioning arms 18a, 18b includes a link end 28a, 28b with a pin 44a, 44b for attaching link members 32a, 32b that are free to rotate with the pins 44a, 44b located outside the power transferring member strands between the drive sprocket 14 and the at least one driven sprocket 16a, 16b. The power transferring member 12, the drive sprocket 14, the driven sprockets 16a, 16b, and spring loading of the tensioning arm shoes can be of any desired conventional configuration.

Still referring to FIG. 5, inside the power transferring member strands, and preferably along a power transferring member centerline (i.e. a line spaced equidistant between the two strands of the power transferring member), an optional rigidly fixed body 46 defining a slot 48 with outer ends extending generally between the drive sprocket 14 and at least one driven sprocket 16a, 16b. The fixed body 46 is located generally central to and inside of the endless loop power transferring member 12. A link assembly 64 includes a first link member 32a and a second link member 32b. A free moving pin 66 is retained in the slot 48 and is pivotally constrained to the first end 40a of the link member 32a and the first end 40b of the link member 32b, restricting the movement of both first ends 40a, 40b of the link members 32a, 32b to that defined by the slot 48 with slot-restrained free moving pin 66. The link end 28a of the first tensioning arm 18a is pivotally attached to a second end 42a of the link member 32a. The pivoting end 24a, 24b of both tensioning arms 18a, 18b can be pivotally attached to an arm movement guide mechanism 26, such as a common fixed pivot pin 26c. The link end 28b of the second tensioning arm 18b is pivotally attached to the second end 42b of the link member 32b. The tension driver mechanism 62 can have a rigidly fixed slotted body 34 for receiving an outwardly spring biased slider body 52 with an outer end 52f in operably engagement, connection, or contact with one of the tensioning arms 18a, 18b. When the slider body 52 of the tension driver mechanism 62 is biased outwards from the fixed slotted body 34 with biasing spring 60, the outer end 52f of the slider body 52 applies force, directly or indirectly, to one of the tensioning arms 18a, 18b. As illustrated in FIG. 5, by way of example and not limitation, the outer end 52f of the slider body 52 engages the tensioning arm 18a adjacent the pin 44a providing pivoting moment at the link end of the tensioning arm 18a, forcing the end 40a of the link member 32a to move with the pin 66 within the slot 48 of the fixed body 34 while moving the first tensioning arm 18a toward the power transferring member centerline in a tensioning manner. Being that the first end 40b of the link member 32b is pivotally attached to the first end 40a of the link member 32a, the link member 32b also moves in the slot 48 of the fixed body 46 with the pin 66 and moves the second tensioning arm 18b toward the power transferring member centerline thereby tensioning the power transferring member 12 nearly simultaneously and nearly equally on both strands. It should be recognized that the mechanical tensioner 62 can be used with a single tensioning arm 18a or 18b without a link assembly 64, if desired.

Figure 4B:
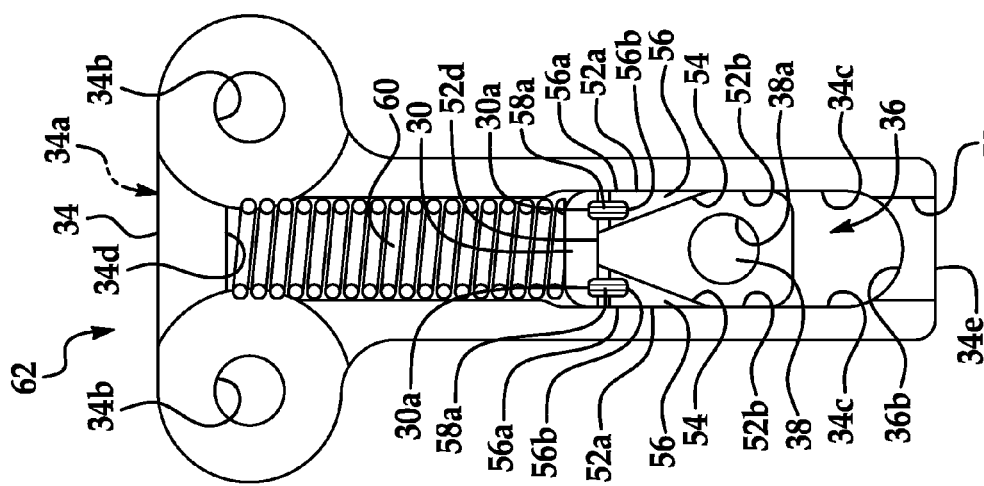
FIG. 4B is an assembled view of the mechanical tensioner with one way damping of FIG. 4A.

Referring now to FIGS. 4A-4B, the configuration of the mechanical tensioner assembly 62 is identical to that illustrated and described with respect to FIGS. 2A 2B, with the exception of the slider body 52 can be modified to replace the at least one wedge spring 58 with two wire form springs 58a, one spring 58a for each wedge 56, located in through slots 30a of yoke 30 and pocketed in a slot 56b in the small side of each wedge 56, forcing the wedge 56 into contact with the sides 34c of the slot in the slotted body 34.

In any of these configurations, a power transmission system using such a multi-strand tensioning arrangement 10 can include a drive sprocket 14 and at least one driven sprocket 16a, 16b wrapped by a continuous chain 12 or belt loop that is flanked by a pair of arms 18a, 18b having a shoe 20a, 20b with a wear surface facing inward toward the sprockets and in contact with the tight and slack strands of the chain loop. Each arm 18a, 18b can have an anchoring pivot 26a, 26b at one end, possibly common with the other arm but not necessarily so, and a link assembly for making a connection through link members 32a, 32b to one another and to a slider assembly 50 at the other end. This multi-strand tensioning arrangement 10 can include a slot defining body 34 rigidly fixed to secure the slot 36 with its ends pointing, generally toward the sprockets 14, 16a, 16b and with a centerline somewhat central to the inside of the chain. A slider body 52 constrained to movement within the length of the slot 36 is pivotally attached to the first end 40a of the first link member 32a and to the first end 40b of the second link member 32b. A second end 42a of the first link member 32a is pivotally attached to the link end 28a of the first tensioning arm 18a. A second end 42b of the second link member 32b is pivotally attached to the link end 28b of the second tensioning arm 18b.

The mechanical tensioner mechanism 62 can include the slider assembly 50 and a link assembly 64 including linking members 32a, 32b, drawing the tensioning arms 18a, 18b together towards the chain centerline, tensioning or squeezing the chain strands between the tensioning arms 18a, 18b equally and simultaneously. By linking the tensioning arms 18a, 18b together the vibrations of one chain strand is linked to the other chain strand and the vibrations are generally neutralized. By linking the tensioning arms 18a, 18b together to a single mechanical tensioner mechanism 62, the force is divided equally between both tensioning arms 18a, 18b when the strands are equal. Since the tensioning arms 18a, 18b are connected, if one strand of the chain tightens, the other strand must slacken. The total tensioning force is applied to resist the tightening strand. The multi-strand tensioning arrangement also allows for the additional tensioning necessary to tension a worn, elongated chain 12. Since the tensioning arms 18a. 18b are connected and tensioning the chain strand is equal and simultaneous between the two tensioning arms 18a, 18b, the increase in chain length is equally absorbed in each chain strand, maintaining the timed relationship of the drive sprocket 14 and driven sprockets 16a, 16b throughout the life of the chain, eliminating the need to compensate for the change in sequential timing due to chain elongation and enhancing the engine performance over its lifetime. To tension an elongated, worn chain 12, the mechanical tensioner mechanism 62 causes the opposing tensioning arms 18a, 18b to be drawn further in toward the chain centerline and the rigidly fixed body 34 squeezing or tensioning the slack and taut strand portions of the chain simultaneously and nearly equally. It is believed that the mechanical tensioner 62, when used to tension dual strands, will probably need to use a compliant face, for better control and noise prevention. A compliant face also allows for a reduced tension spring force and therefore reduced parasitic friction.

An apparatus 10 imparts tension to multiple strands of a power transferring member 12 forming an endless loop to conform to a radius of curvature of spaced apart devices 14, 16a, 16b rotatable about respective spaced apart axes. Each device 14, 16a, 16b has a drive face radially spaced from the axis of rotation for intended power transferring engagement of the power transferring member 12 between the spaced apart devices 14, 16a, 16b. The apparatus can include two tensioning arms 18a, 18b spaced apart from one another at respective outer ends 28a, 28b for pivoting movement independent of one another. The two tensioning arms 18a, 18b support inwardly facing shoes 20a, 20b with chain-sliding faces 22a, 22b. A link assembly 64 can include at least two link members 32a, 32b pivotally connected to one another at respective first ends 40a, 40b. The connected first ends 40a, 40b are constrained for limited movement along a fixed slot 36 extending generally along a centerline of the endless loop 12 between the spaced apart devices 14, 16a, 16b. The at least two link members 32a, 32b are pivotally connected individually to outer ends 28a, 28b of opposite ones of the two spaced apart tensioning arms 18a, 18b at second locations 42a, 42b spaced from the first ends 40a, 40b. A biasing spring 60 can drive the slider assembly 50, link assembly 64, and connected tensioning arms 18a, 18b in motion for tensioning the power transferring member 12 nearly simultaneously and nearly equally on both strands.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tensioning system for imparting tension to an endless loop power transferring member encircling a drive sprocket and at least one driven sprocket comprising:
    at least one tensioning arm, each tensioning arm mounted for movement relative to the endless loop power transferring member and having a shoe with a sliding face; and
    a mechanical tensioner with one way damping mechanism including a slider assembly having a rigidly fixed slotted body defining a slot with outer ends, a slider body retained in the slot of the fixed slotted body and operably connected to the at least one tensioning arm for driving the at least one tensioning arm in movement relative to the endless loop power transferring member, and a biasing spring engageable between the fixed slotted body and the slider body for urging the slider body in a predetermined direction, the slider body defining pockets between the slider body and side walls defining the slot of the slotted body, a pair of wedges located in the pockets for movement toward the side walls when the slider body moves against the urging of the biasing spring, and a wedge spring urging the wedges toward the side walls of the slotted body.

2. The tensioning system of claim 1 further comprising:
    the at least one tensioning arm including a pair of tensioning arms, each tensioning arm having a link pivot; and
    a link assembly including first and second link members, each link member having a corresponding first end and a corresponding second end, each second end connected to the corresponding link pivot of one of the pair of tensioning arms.

3. The tensioning system of claim 2 further comprising:
    the fixed slotted body located generally central to and inside of the endless loop power transferring member and extending generally between the drive sprocket and at least one driven sprocket, and the slider body pivotally constrained to the first ends of the first and second link members for limiting both first ends to motion defined by the slot.

4. The tensioning system of claim 2, wherein the slider assembly further comprises:
    a pin connected to the slider body and extending outwardly from the slider body beyond the slotted body on opposite sides for attachment to the link members on both sides of the slotted body for maintaining the slider body within the slot of the slotted body.

5. The tensioning system of claim 1, wherein the slider assembly further comprises:
    the slider body defining a wedge-spring receiving aperture extending therethrough;
    each wedge defining a blind wedge-spring receiving aperture coaxial with the wedge-spring receiving through aperture of the slider body; and
    the wedge spring defining a compression spring located within the coaxial wedge-spring receiving aperture.

6. The tensioning system of claim 1, wherein the slider assembly further comprises:
    a yoke engaged with the slot of the slotted body and connected to the slider body for movement therewith.

7. The tensioning system of claim 6, wherein the slider assembly further comprises:
    the yoke defining a wedge-spring receiving slots;
    each wedge defining a wedge-spring receiving slot aligned with the wedge-spring receiving slot of the yoke; and
    the wedge spring defining a wire form spring located within the aligned wedge-spring receiving slots.

8. The tensioning system of claim 1, wherein the slider assembly further comprises:
    a pin connected to the slider body and extending outwardly from the slider body from one end of the slot for applying force to the at least one tensioning arm with biasing spring.

9. An apparatus for imparting tension to multiple strands of an endless loop power transferring member to conform to a radius of curvature of spaced apart devices rotatable about respective spaced apart axes of rotation, and each device having a drive face radially spaced from an axis of rotation for intended power transferring engagement of the endless loop power transferring member between the spaced apart devices, the apparatus comprising:
    two tensioning arms spaced apart from one another at respective outer ends for movement independent of one another, the two tensioning arms supporting inwardly facing shoes with sliding faces; and
    a tensioner mechanism including a slider assembly and a link assembly, the slider assembly including a fixed slotted body defining a slot extending generally along a centerline of the endless loop power transferring member located between the spaced apart devices, a slider body engaged within the slot for limited movement between opposite longitudinal ends of the slot, and a biasing spring for urging the slider body toward one longitudinal end of the slot, the link assembly having at least two link members pivotally connected to one another at respective first ends, the connected first ends constrained for limited movement along the slot, the at least two link members pivotally connected individually to respective outer ends of opposite ones of the two spaced apart tensioning arms at second locations spaced from the first ends, the tensioner mechanism for driving the tensioning arms in motion for tensioning the endless loop power transferring member nearly simultaneously and nearly equally on both strands, the slider body defining pockets between the slider body and side walls defining the slot of the slotted body, a pair of wedges located in the pockets for movement toward the side walls when the slider body moves against the urging of the biasing spring, and a wedge spring urging the wedges toward the side walls of the slotted body.

10. The apparatus of claim 9, wherein the slider assembly further comprises:
   the slider body defining a wedge-spring receiving aperture extending therethrough;
   each wedge defining a blind wedge-spring receiving aperture coaxial with the wedge-spring receiving through aperture of the slider body; and
   the wedge spring defining a compression spring located within the coaxial wedge-spring receiving aperture.

11. The apparatus of claim 9, wherein the slider assembly further comprises:
   a yoke engaged with the slot of the slotted body and connected to the slider body for movement therewith.

12. The apparatus of claim 11, wherein the slider assembly further comprises:
   the yoke defining a wedge-spring receiving slots;
   each wedge defining a wedge-spring receiving slot aligned with the wedge-spring receiving slot of the yoked; and
   the wedge spring defining a wire form spring located within the aligned wedge-spring receiving slots.

13. The apparatus of claim 9, wherein the slider assembly further comprises:
   a pin connected to the slider body and extending outwardly from the slider body beyond the slotted body on opposite sides for attachment to the link members on both sides of the slotted body for maintaining the slider body within the slot of the slotted body.

14. The apparatus of claim 9, wherein the slider assembly further comprises:
   a pin connected to the slider body and extending outwardly from the slider body from one end of the slot for applying force to the tensioning arms with the biasing spring.

* * * * *